(12) United States Patent
Abrams et al.

(10) Patent No.: US 7,212,223 B2
(45) Date of Patent: May 1, 2007

(54) LABELING WITH THERMALLY CONDUCTIVE PADS

(75) Inventors: Mitchell A Abrams, Corvallis, OR (US); Ravi Prasad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/422,002

(22) Filed: Apr. 22, 2003

(65) Prior Publication Data
US 2004/0213922 A1    Oct. 28, 2004

(51) Int. Cl.
*B41J 2/47* (2006.01)
*B41J 2/455* (2006.01)
*C23C 14/30* (2006.01)

(52) U.S. Cl. .................. 347/225; 347/224; 427/596

(58) Field of Classification Search .............. 427/554, 427/555, 556, 557, 558
See application file for complete search history.

(56) References Cited

U.S. PATENT DOCUMENTS

| | | | |
|---|---|---|---|
| 3,761,942 A * | 9/1973 | Lorenz et al. | 430/374 |
| 4,661,305 A * | 4/1987 | Carlomagno | 264/132 |
| 4,998,010 A * | 3/1991 | Chandler et al. | 235/494 |
| 5,631,056 A * | 5/1997 | Kawanishi et al. | 428/64.1 |
| 5,715,934 A | 2/1998 | Tobol et al. | |
| 5,870,072 A * | 2/1999 | Tuli | 345/106 |
| 6,240,990 B1 | 6/2001 | Claussnitzer | |
| 6,298,332 B1 | 10/2001 | Montague | |
| 6,329,035 B1 | 12/2001 | Iwasaki | |
| 6,384,929 B1 | 5/2002 | Miller | |
| 6,403,191 B1 | 6/2002 | Casagrande | |
| 6,514,588 B2 | 2/2003 | Rosenbaum et al. | |
| 6,829,000 B2 * | 12/2004 | Assa et al. | 347/257 |
| 6,867,793 B2 * | 3/2005 | Field | 347/225 |
| 2003/0012932 A1 | 1/2003 | Wang | |

FOREIGN PATENT DOCUMENTS

| | | |
|---|---|---|
| DE | 19727735 | 1/1999 |
| EP | 1308938 A2 * | 5/2003 |

OTHER PUBLICATIONS

Austrian Patent Office Search and Examination Report mailed Jan. 12, 2007, for Singapore Patent App. No. 200400656-5, Hewlett Packard Docket No. 200208786-2 (6 pages).

* cited by examiner

*Primary Examiner*—Timothy Meeks
*Assistant Examiner*—David Turocy

(57) ABSTRACT

A method of labeling an object includes selectively applying focused energy to thermally conductive pads on the object to create a label on the object. The conductive pads are disposed adjacent to a thermochromic layer.

26 Claims, 6 Drawing Sheets

LABELING WITH THERMALLY CONDUCTIVE PADS

BACKGROUND

Optical discs have fast become an industry standard for data storage in the fields of computers, video, and music. Optical discs include, but are not limited to, compact discs (CDs), Digital Video (or Versatile) Discs (DVDs) and game system discs in a variety of formats. Commercially produced optical discs usually have digital data recorded on one side of the disc and a visual display printed on the other side of the disc.

In some instances, optical discs are created that can store data on both sides of the disc. However, in many cases, it is desirable to limit the optical disc data to a single side of the disc, leaving the other side of the disc for printed text, patterns or graphics. The printed labeling on a non-data side of an optical disc can include a decorative design, text identifying the data stored on the disc, or both.

As optical technology has advanced, writeable and rewritable optical discs and equipment for writing onto the discs have become reasonably priced within the grasp of ordinary consumers. Thus, many consumers currently have the ability to store data on an optical disc with home office equipment.

However, very specialized and expensive equipment is required to print labeling on an optical disc. Consequently, the labeling of discs by most consumers is typically limited to printing on separate adhesive labels that are adhered to the non-data side of the disc or hand-writing with a marker directly on the disc or an adhesive label.

SUMMARY

A method of labeling an object includes selectively applying focused energy to thermally conductive pads on the object to create a label on the object. The conductive pads are disposed adjacent to a thermochromic layer.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

Figure 1:
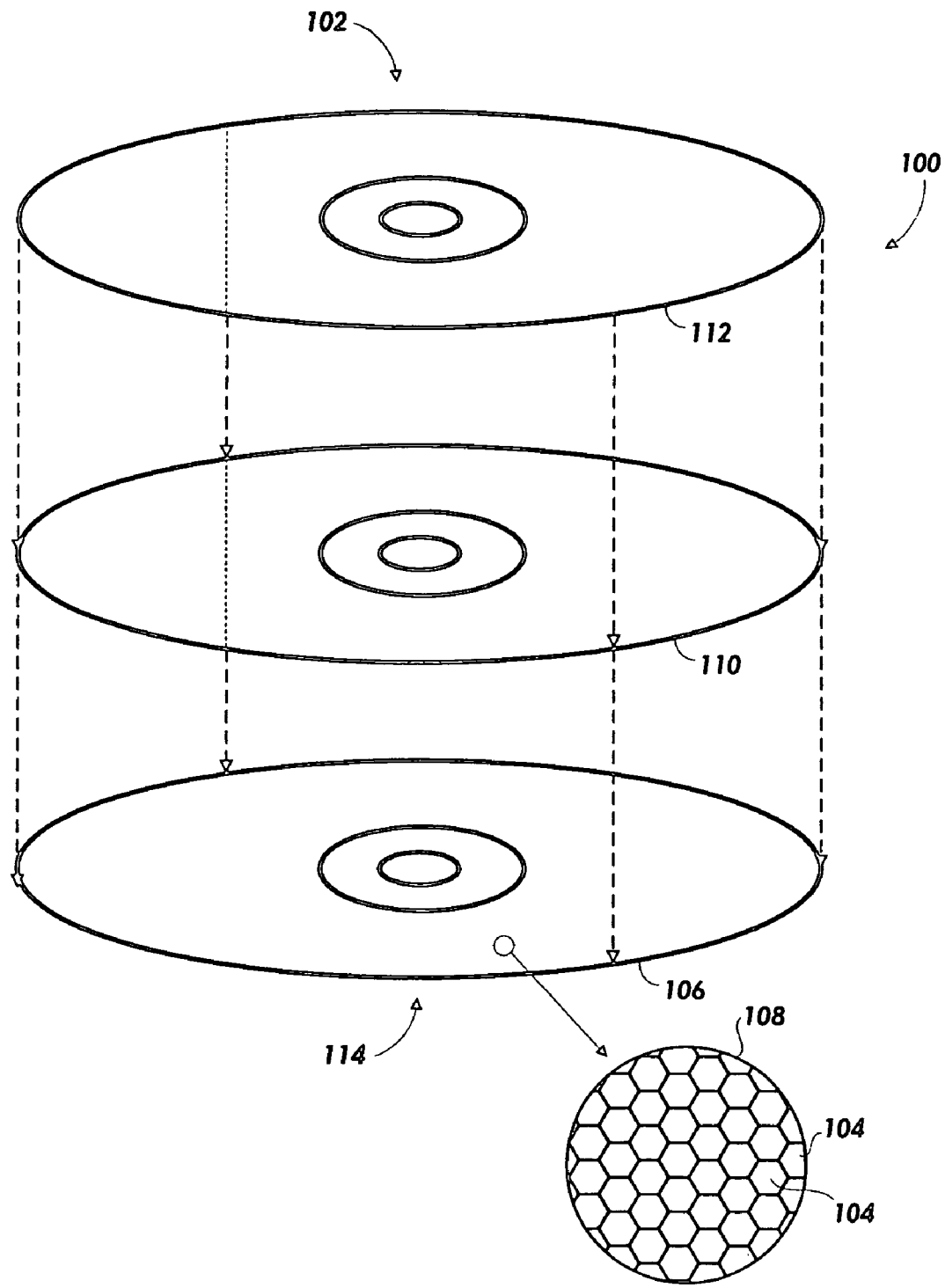
FIG. 1 is an exploded view of an optical disc and detailed inset according to one embodiment of the present invention.

Writeable and rewritable optical disks include materials that change optical properties (e.g. reflection, refraction, absorption, transmission, diffraction, and scatter) when heated by a focused energy source (e.g. a writing laser). By selectively changing the optical properties of particular points along an optical disc's spiral data track and leaving other areas unaffected, digital data is recorded on the disk that computers and/or audiovisual equipment can read. Some changes in optical properties, for example, a change in reflectivity, are also readily visible to consumers and typically indicate that data is stored on the optical disc. Therefore, in addition to storing data on an optical disc, it is also possible to create visible printed patterns or graphical designs on the disc by selectively changing the optical properties of portions of the disc.

However, lasers used to write data onto the optical disk data track are very tightly focused and of very high resolution (~12,000 dpi) to facilitate storage of very large amounts of data. Such high resolution lasers require thousands of laser strikes to create one 300 dpi visible spot. Consequently, it would take a very long time, perhaps an hour or more, to write a small printed pattern or graphical design onto a conventional optical disc in this manner. As a result, it is not common currently for printed patterns and/or graphical designs to be written onto conventional optical discs using the same laser that also writes digital data to the disc.

The present specification describes a mass media storage device, such as an optical disc, and methods of making and using such an optical disc. The specification also describes methods of labeling mass media storages devices or any other object by the application of focused energy.

As used in this specification and the appended claims, the term "optical disc" is used broadly to encompass discs for recording music, pictures, video and/or software, etc.. An optical disc includes, but is not limited to, writable and rewritable storage devices including, but not limited to, Compact Discs (CDs), Compact Disc Read-Only Memory (CD-ROMs) and Digital Video (or Versatile) Discs in various formats.

"Label" or "labeling" means any text, printed pattern, graphical design or combination thereof on an object. If a label is added to an optical disc, typically the label is found on one side of the optical disc, although this is not necessarily the case. "Printed pattern", means any text, letters, words, symbols, or characters that are found on an object as part of a label for that object. "Graphical design" means any graphic or image that is found on an object as part of a label for that object. "Uniform" means having the same or substantially the same design or pattern throughout.

As mentioned above, it is possible to write labels on current optical discs by applying a laser to the discs in certain patterns. The application of the laser changes the optical properties (such as reflectivity) of the exposed portions of the disc, resulting in patterns that can be made large enough to be visible to users. Lasers for writing digital, machine-readable data on optical discs are typically focused at about 2.2 µm. Therefore, if such a laser is used to also write a label onto a disc, because of the extremely small pixel size that would result, it takes a very long time to produce labels.

While typically, the smaller the pixel size, the better resolution in a printed product, a 2.2 µm pixel size is unnecessarily small to print a quality label. Therefore, an optical disc is described below for facilitating faster labeling without compromising data storage capability. Subsequent to the description of the optical disc itself, methods for making an optical disc are discussed, followed by a discussion of actually creating a label on the optical disc. However, it will be understood that the methods described herein are not limited to labeling optical discs. The methods and apparatus described below may be implemented with any object to facilitate labeling by the application of focused energy. The particular implementations described below with reference optical discs are therefore exemplary in nature, and not limiting. For example, the labeling techniques and apparatus described below may be applied to bottles, cans, or any other objects.

Figure 4A:
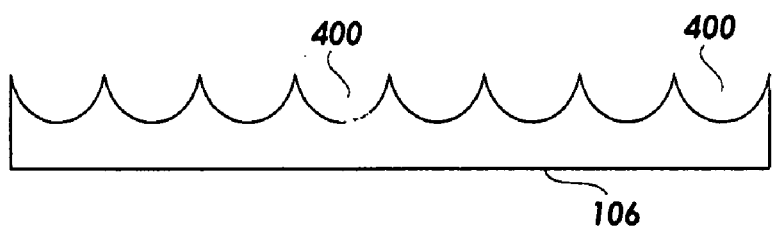
FIG. 4A is a side view of a first layer of an optical disc according to one embodiment of the present invention.
Figure 4B:
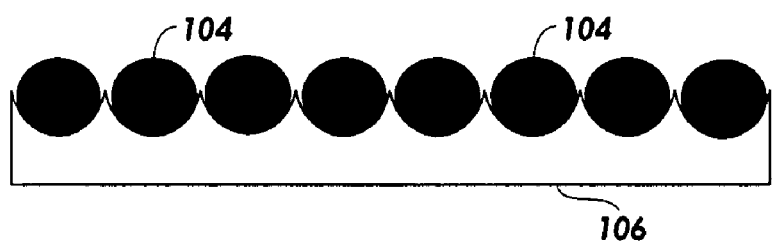
FIG. 4B is a side view of first and second layers of an optical disc according to one embodiment of the present invention.

Turning now to the figures, and in particular FIG. 1, an exploded view of an optical disc (100) is shown according to the principles described herein. The optical disc (100) includes a label side (102) designed to facilitate labeling thereon by the application of focused energy. Instead of a long spiral track or an unusable surface typical of most optical discs, the label side (102) of the optical disc (100) includes a plurality of thermally conductive pads (104) formed on an insulating layer (106). The insulating layer (106) may include a polymer or other insulating material. The thermally conductive pads (104) formed on the insulating layer (106) are shown in a detailed inset (108) as they are generally not visible to the naked eye. The making of the thermally conductive pads (104) is discussed in detail below with reference to FIGS. 4A–B.

Figure 2:
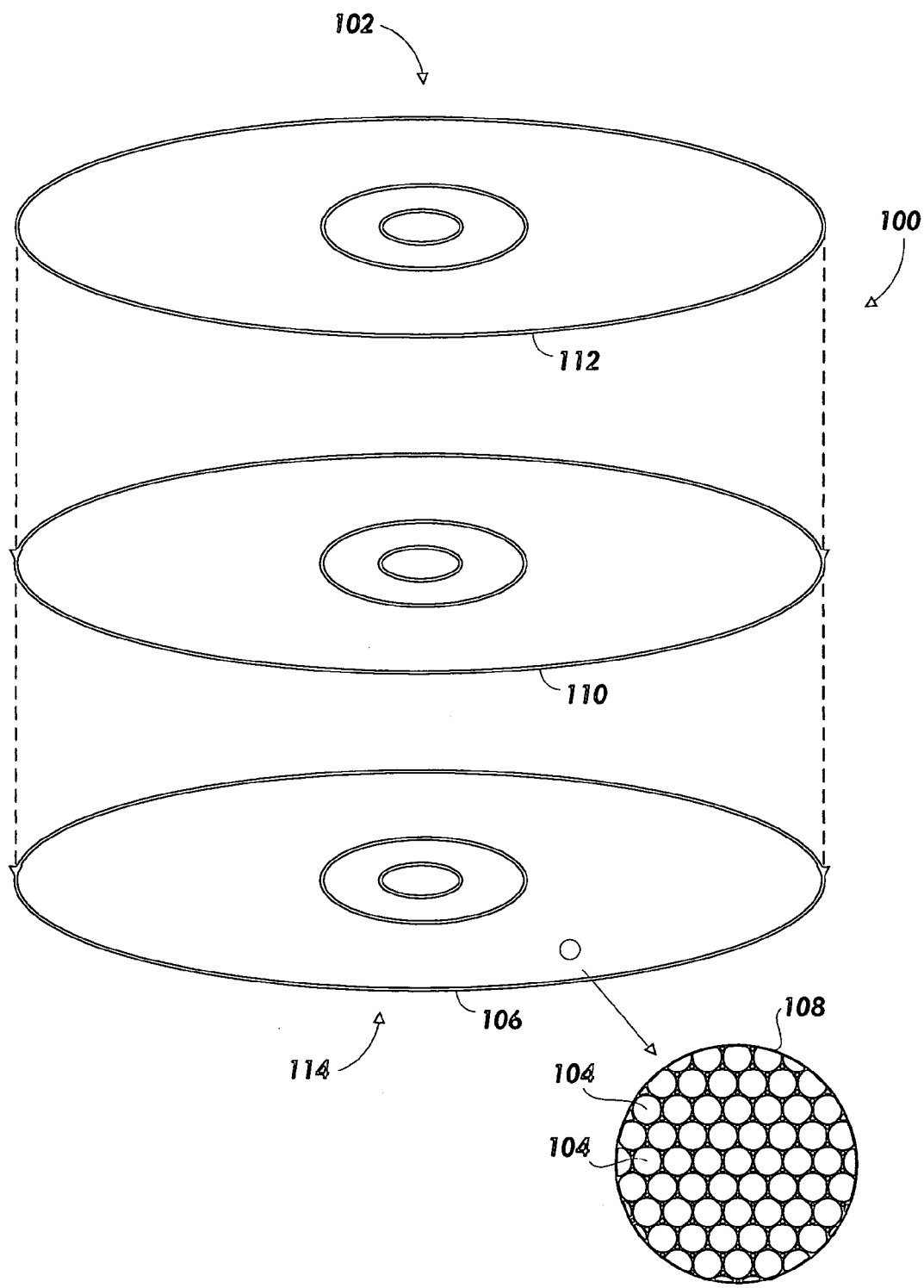
FIG. 2 is an exploded view of another optical disc and detailed inset according to one embodiment of the present invention.
Figure 3:
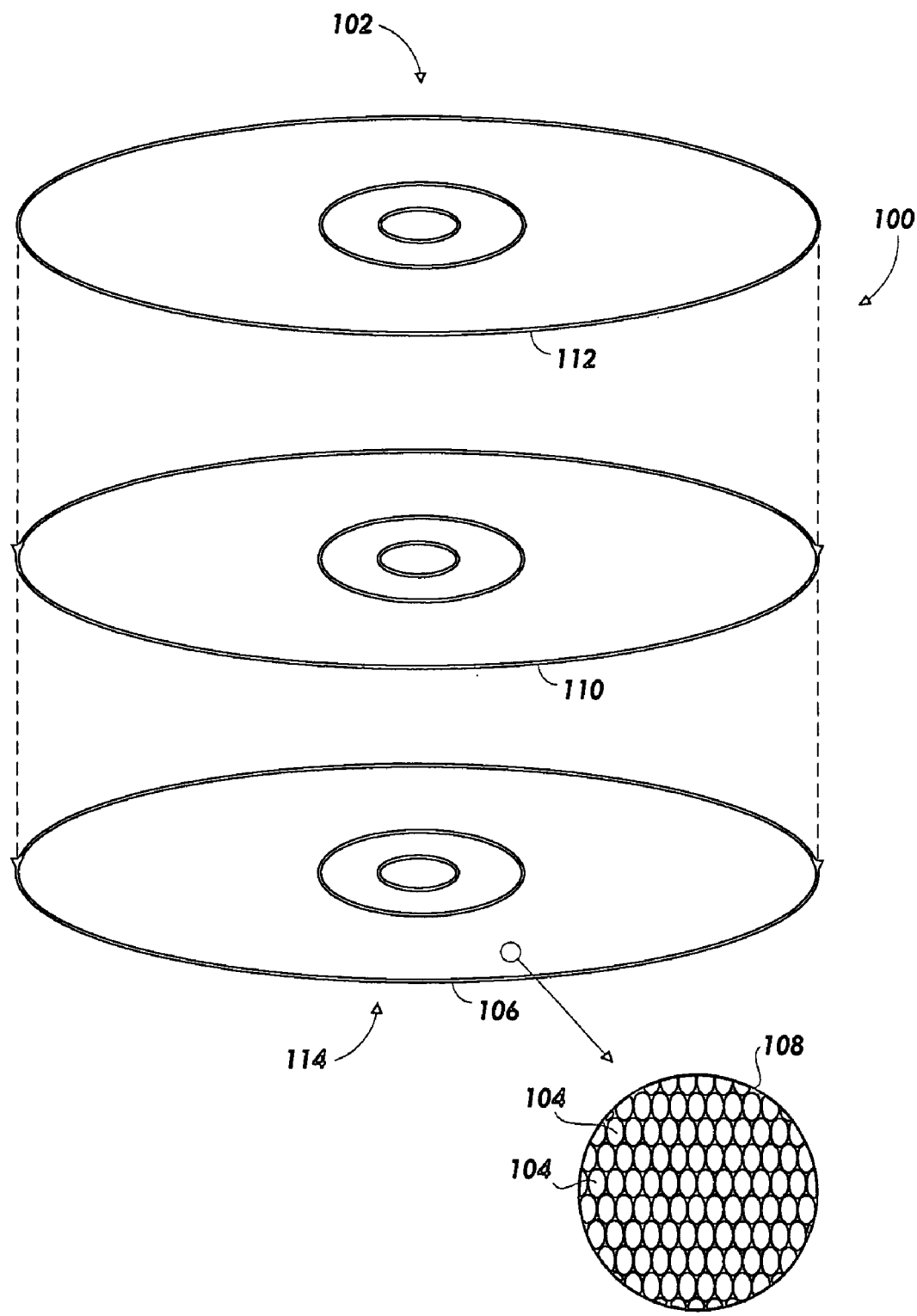
FIG. 3 is an exploded view of another optical disc and detailed inset according to one embodiment of the present invention.

As shown in FIG. 1, the thermally conductive pads (104) are each distinct and may be hexagonal. However, while the hexagonal shapes shown can be densely packed, the shape of the thermally conductive pads (104) is not so limited. Any polygonal shape, and any other shape including any combination of straight and/or curved lines, may also be used for the pads (104). For example, the thermally conductive pads (104) may be circular as shown in FIG. 2, or elliptical as shown in FIG. 3.

The size of the thermally conductive pads (104) can be set at any desired size and will correspond to the size of a pixel in the label that is to be produced on the disc (100). For example, the size of the thermally conductive pads may be larger than approximately 5 µm. In some examples, the size of the conductive pads (104) is between approximately 5 and 50 µm. Within that range, in some examples, the size of the conductive pads is about 32 µm.

The thermally conductive pads (104) are arranged adjacent to a thermochromic layer (110) that is discussed in more detail below with reference to FIGS. 4C–D. The thermochromic layer (110) includes thermochromic materials that change in optical density when heated. Changes in optical density may be visible to the human eye and expressed in a variety of different colors, depending on the thermochromic material. For example, the thermochromic layer (110) may include leuco dye. The thermochromic layer (110) may be covered with an optically transparent layer (112) to protect the thermochromic layer (110) from scratches or other damage. Preferably, the optically transparent layer (112) will not absorb energy of wavelengths associated with lasers typically used to read and/or write optical discs. The optically transparent layer (112) may be polycarbonate or another material and is also discussed below with reference to FIG. 4D.

The pixel size of the thermally conductive pads (104) is substantially larger than the typical focus size of an optical writing laser, facilitating faster labeling than previously possible using a focused energy emission source, such as an optical writing laser. As suggested by the name, each of the thermally conductive pads (104) includes a thermally conductive material. The thermally conductive material may include, for example, carbon or other thermal conductors. Accordingly, a focused energy source may direct energy to any portion of an individual thermally conductive pad (104), and the thermally conductive pad (104) will absorbs the energy and substantially evenly distributes the absorbed energy across the pad.

As the energy is absorbed and distributed across the thermally conductive pad (104), the temperature of the pad increases. When the conductive pad (104) increases in temperature, the pad (104) transfers heat to portions of the thermochromic layer (110) adjacent to the pad (104). The heat transferred to the thermochromic layer (110) results in an optical density change for that portion of the thermochromic layer (110) that is heated. By selectively applying focused energy to the thermally conductive pads (104), a label of printed patterns and/or graphical designs may be quickly added to the optical disc (100) in the thermochromic layer (110).

Instead of selectively writing a label to the optical disc (100) with a 2.2 µm pixel size, the use of the thermally conductive pads (104) facilitates writing labels with a pixel size of 5–50 µm or greater, corresponding to the size of the thermally conductive pads (104). This decreases the labeling write time by about 2–20 times or more. In addition to the example of an optical disc, the thermally conductive pads (104) may be combined with a thermochromic layer (110) and added to any other object to facilitate labeling of that object.

In addition to enabling faster label creation, the introduction of the thermally conductive pads (104) may add to the accuracy of the labels. A typical 2.2 µm pixel created by writing to conventional optical discs tends to be misshaped (tear-shaped or elliptical) because of the rotation of the optical disc during writing. The use of specially shaped thermally conductive pads (104) ensures a desired pixel size and shape. And, although the thermally conductive pads (104) shown are all the same size, this is not necessarily so. The size and shapes of the thermally conductive pads (104) of an object may be uniform as shown, or may vary. Further, use of the relatively large thermally conductive pads (104) increases tolerance for positional errors of the focused energy emission source. Energy may be directed to any portion of the conductive pad (104), and the pad (104) will still substantially evenly distribute the energy and uniformly heat the thermochromic layer (110).

The optical disc (100) (or other object) with the thermally conductive pads (104) may be made according to any of a number of methods. Particular methods of manufacture are discussed below, however, the methods discussed below are exemplary in nature and not limiting. Turning to FIGS. 4A–D, a series of side view images of the optical disc (100) is shown in various stages of disc manufacture. According to one embodiment, the manufacture of the optical disc (100) includes indenting the insulating layer (106). As mentioned above, the insulating layer (106) may be a polymer or other deformable material. A pattern, preferably a uniform pattern, is stamped into the insulating layer (106) to form a plurality of indentations (400). The shape of the indentations (from a top view) corresponds with the hexagonal, curved, circular, elliptical, or other shapes discussed above and/or shown in FIGS. 1–3 as being possible shapes for the thermally conductive pads. The pattern may be stamped with a rigid die or other tool. Alternatively, the pattern of indentations (400) may be microembossed into the insulating layer (106) or screen-printed onto the insulating layer (106). Other methods of forming the indentations (400) may also be used.

After indenting a pattern onto the insulating layer (106), a thermally conductive material is deposited onto the insulating layer (106) and/or into the indentations (400). For example, a thermally conductive material such as carbon in a solvent may be fluidly layered across the insulating layer (106). One example of a carbon/solvent mixture is ink commonly used in inkjet printers. Following application of a liquid conductive layer, the solvent is allowed to evaporate, leaving the solid carbon or other thermally conductive material in the indentations (400). Alternatively, the thermally conductive material may be inserted directly into the individual indentations (400), and there may be no need for an evaporation time allowance. The thermally conductive material disposed in the indentations defines the thermally conductive pads (104) shown in FIG. 4B.

Figure 4C:
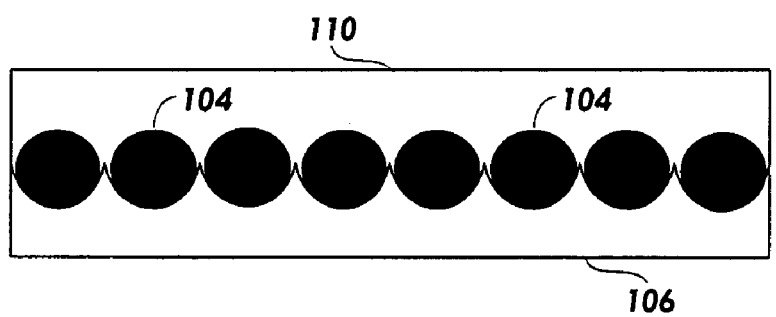
FIG. 4C is a side view of first, second, and third layers of an optical disc according to one embodiment of the present invention.

Following the formation of the thermally conductive pads (104), the thermochromic layer (110) is disposed over the thermally conductive pads (104) and the insulating layer (106) as shown in FIG. 4C. The thermochromic layer (110) may include leuco dye or other materials known to change color with the application of heat. Preferably, the thermochromic layer (110) is initially transparent to the wavelength of light generated by an energy emitter, for example, a writing laser. The material of the thermally conductive pads (104), on the other hand, is highly absorptive of the wavelength of energy emitted.

Figure 4D:
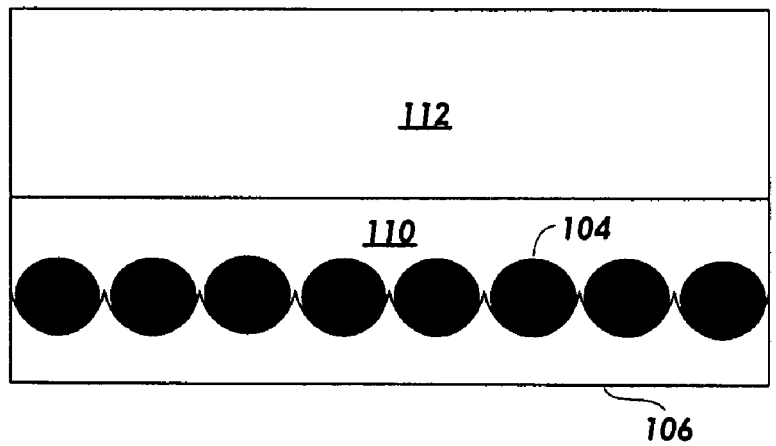
FIG. 4D is a side view of first, second, third, and fourth layers of an optical disc according to one embodiment of the present invention.

An optically transparent layer (112) may be disposed over the thermochromic layer (10) as shown in FIG. 4D, although this is not necessarily so. According to some embodiments, there is no optically transparent layer (112) in addition to the thermochromic layer (110). The transparent layer (112) may be, for example, polycarbonate or some other protective material. The transparent layer (112) may be spin-coated onto the thermochromic layer (110) and protects the thermochromic layer (110) and/or the conductive pads (104) from scratches or other damage.

It will be understood that opposite of the label side (102, FIG. 1) of the optical disc (100, FIG. 1) will normally be a data side (114, FIG. 1). The data side (104, FIG. 1) may be fabricated according to conventional methods that are well known to those of skill in the art having the benefit of this disclosure. The data side (104, FIG. 1) therefore includes all of the layers typical of writable or rewritable optical discs in various formats. However, according to some embodiments, there may be two label sides (102, FIG. 1) and no data side (104, FIG. 1). According to embodiments with two label sides (102, FIG. 1), only printed patterns and graphical designs may be created, and no digital data may be recorded.

In an alternative construction, a specialty film could be made to include the thermally conductive pads and an insulator. The specialty film could then be applied to an object such as an optical disc, but it may also be added to any other object to facilitate labeling.

According to some aspects of the construction of an optical disc, a label side may also include some permanent information that is human or machine readable. Such permanent information may include, but is not limited to: the optical disc format, the color that will be viewable when the optical density of the thermochromic layer is changed, etc.

Turning now to a discussion of an actual labeling operation according to the principles discussed herein, labeling of the optical disc (100, FIG. 1) or other objects may be accomplished with a number of commercially available products. For example, a computer with a CD Read/Write (RW) or DVD-RW drive may be used to label the optical disc (100, FIG. 1). However, other products capable of writing to optical discs may also be used including, but not limited to, CD and DVD recorders. For purposes of example and discussion, a computer system (500) that may be used in combination with the optical disc (100) to generate a label thereon is shown in FIG. 5.

The computer system (500) includes a mount (502) and a motor (504) for holding and spinning the optical disc (100). The label side (102) of the disc (100) is shown facing the mount (502) such that a label may be written to the disc (100). It will be understood, of course, that data may also be written to the data side (114) of the optical disc (100) if the disc is turned over.

Positioned to face a portion of the label side (102) of the optical disc (100) is a track (506) providing for movement of a sled (508) radially with respect to the optical disc (100). Movement of the sled (508) is actuated by a solenoid (509) or other device. A focused energy emitting device or devices, which in the present embodiment includes a first, second and third laser (510, 512, 514, respectively), is disposed on the sled (508). The first laser (510) is a writing laser with enough power to quickly heat the thermally conductive pads (104, FIG. 1) of the optical disc (100). The second laser (512) is an erasing laser that may be used, for example, to erase CDRW discs. The third laser (514) is a read laser and is less powerful than the first and second lasers (510 and 512) and may be used to emit a beam that is reflected and read by a detector (516). The detector (516) is also positioned on the sled (508). The third laser (514) is used when reading data from the data side (114) of the optical disc (or, in some cases, some data from the label side (102). Signals received by the detector may be conditioned by a signal conditioner (515) when the system (500) is in a reading mode.

Figure 5:
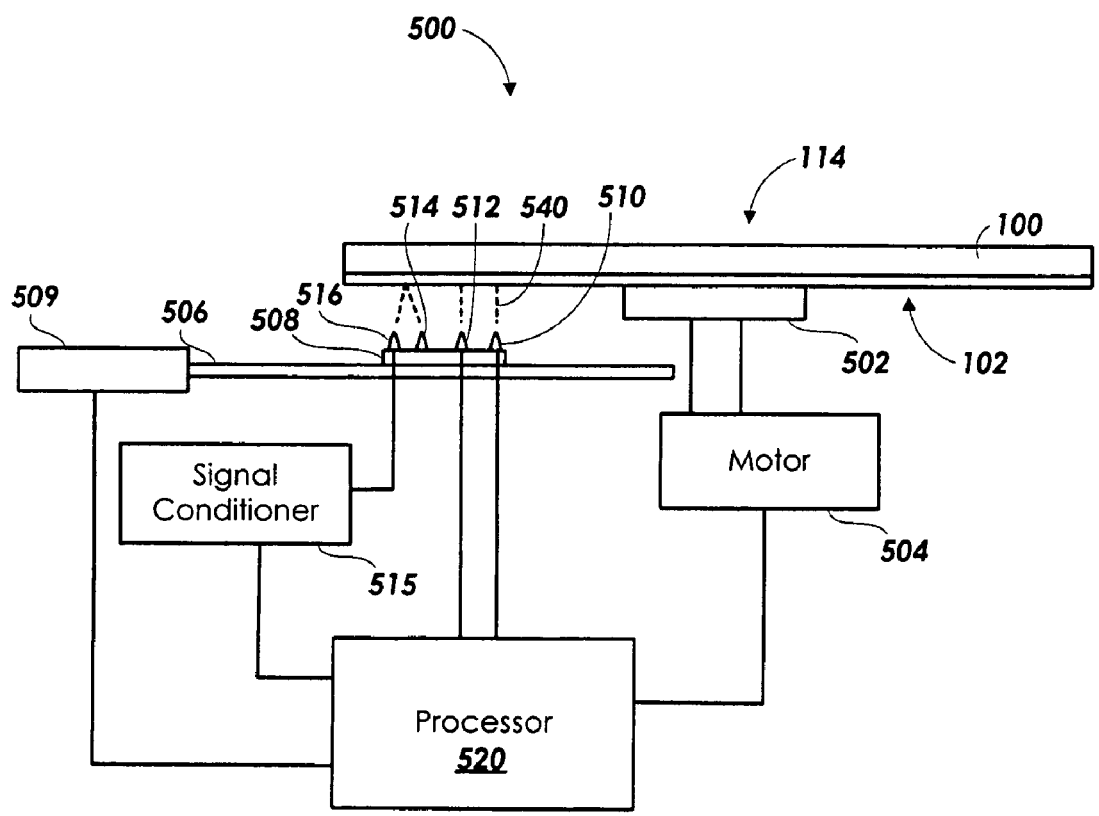
FIG. 5 is a diagrammatical side view of an optical disc labeling system according to one embodiment of the present invention.

However, the system (500) is in a writing mode as shown in FIG. 5 and as the optical disc (100) spins, a label can be written on the label side (102) by applying the first laser beam (540) from the first laser (510) at selective locations. The system is controlled by a processor (520). The processor (520) controls the firing of the lasers (510, 512, 514), the rotation of the motor (504), and the position of the sled (508). The first laser (510) can aim an energy beam (540) very precisely to hit one or more of the thermally conductive pads (104, FIG. 1).

When the energy beam (540) strikes one of the thermally conductive pads (104, FIG. 1), the conductive material evenly distributes the energy across the pad (104, FIG. 1) and increases in temperature. The resulting increase in temperature heats a portion of the thermochromic layer (110) corresponding to the shape and size of the thermally conductive pad (104, FIG. 1) that the thermochromic layer (110) is adjacent to. With an increase in temperature, that portion of thermochromic layer (110) adjacent to the thermally conductive pads (104, FIG. 1) changes optical density and becomes visible, colored or non-transparent. It should be noted that heat transfer from the thermally conductive pad (104, FIG. 1) to the thermochromic layer (110) will continue even after the energy beam (540) has moved to another pad (104). Therefore, the label writing process can proceed quickly as the laser (510) is aimed to strike different conductive pads (104, FIG. 1). The laser need only be applied long enough to sufficiently heat the conductive pad (104, FIG. 1) and does not have to be applied until the thermochromic layer (110) has changed optical properties.

Figure 6:
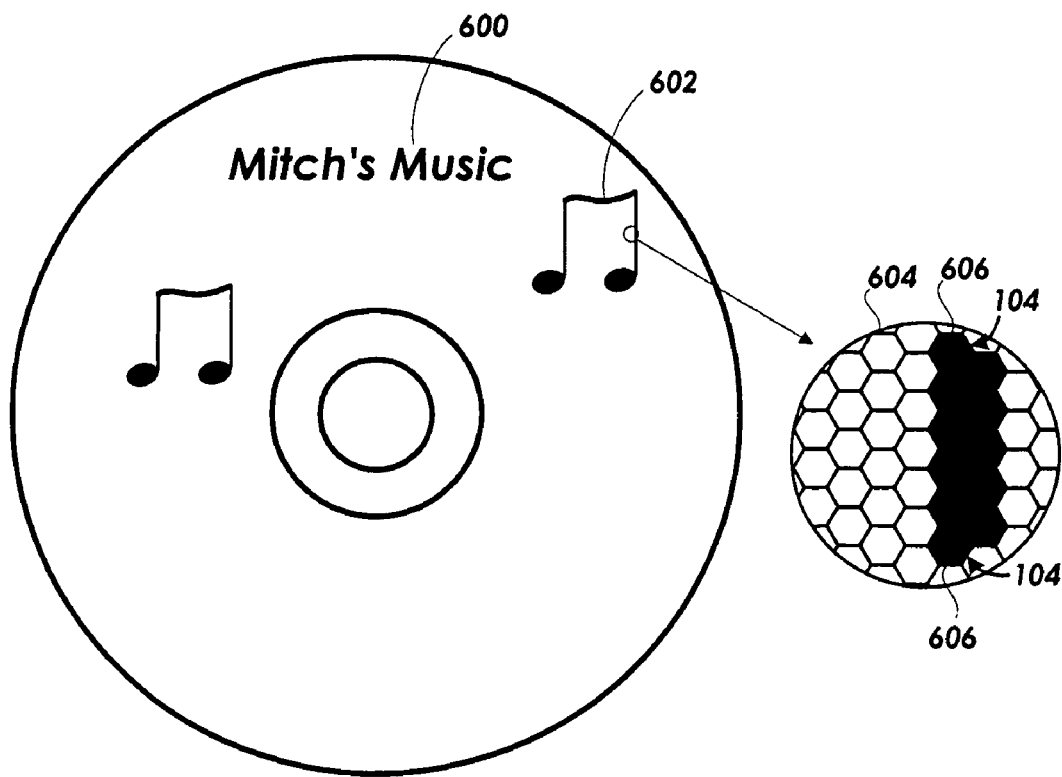
FIG. 6 is a top view of an optical disc with a label made according to one embodiment of the present invention.

The first laser (510) applies the energy beam (540) to all locations programmed in the processor (520) to create a label, e.g., printed pattern and/or graphical display. For example, the first laser (510) may apply energy to selective thermally conductive pads (104) to create a printed pattern (600) or graphical design (602) as shown in FIG. 6. An inset (604) shows that individual pixels (606) have been selectively colored by the application of energy to associated conductive pads (104).

The preceding description has been presented only to illustrate and describe embodiments of invention. It is not intended to be exhaustive or to limit the invention to any precise form disclosed. Many modifications and variations are possible in light of the above teaching. The principles described herein, including using thermally conductive pads under a thermochromic material, may be adapted to any object. It is intended that the scope of the invention be defined by the following claims.

What is claimed is:

1. A method of visually labeling an object comprising selectively applying focused energy to thermally conductive pads on said object to heat said thermally conductive pads on said object, wherein said heat creates to a permanent, visible label on said object, said label comprising a printed pattern or a graphical design, wherein said conductive pads are disposed adjacent to a thermochromic layer, and wherein an optical property of corresponding portions of said thermochromic layer changes in response to said heat of said thermally conductive pads to form said permanent, visible label.

2. The method of claim 1, wherein said thermally conductive pads correspond to pixels in said label.

3. The method of claim 1, further comprising changing an optical density of said portions of said thermochromic layer with said selective heating to form said visible label.

4. The method of claim 1, wherein said conductive pads are between five and fifty μm across.

5. The method of claim 1, wherein said conductive pads have a hexagonal shape.

6. The method of claim 1, wherein said conductive pads have an elliptical shape.

7. The method of claim 1, wherein said conductive pads have a circular shape.

8. The method of claim 1, wherein said label is printed with a resolution of 5 μm or greater.

9. The method of claim 1, wherein said printed pattern comprises legible text.

10. A method of using an optical disc comprising applying focused energy in a predetermined pattern to a plurality of thermally conductive pads formed on said optical disc to heat selected thermally conductive pads, which heat creates a permanent, visible, human-readable label on a non-data side of said disc.

11. The method of claim 10, further comprising heating portions of a thermochromic layer with corresponding thermally conductive pads that are heated by said focused energy, wherein said heating portions of said thermochromic layer causes the heated portions to change optical properties thereby forming said visible label.

12. The method of claim 10, wherein each of said plurality of thermally conductive pads represents a pixel of said visible label and has a pixel size of approximately five to fifty μm.

13. The method of claim 10, wherein each of said thermally conductive pads has a hexagonal, circular, or elliptical shape.

14. The method of claim 10, wherein each of said thermally conductive pads comprises a thermally conductive material disposed in an indent formed in said optical disc.

15. A method of labeling an optical disc comprising selectively applying laser light to thermally conductive pads formed in said optical disc to create a permanent, visible label on a non-data side of said disc, said label being indicative to a human user of data stored on an apposite, data side of said optical disc, wherein said thermally conductive pads are disposed adjacent to a thermochromic layer.

16. The method of claim 15, further comprising heating portions of said thermochromic layer corresponding to selected thermally conductive pads.

17. The method of claim 16, further comprising changing an optical density of portions of said thermochromic layer adjacent to selected conductive pads to form said visible label.

18. The method of claim 15, wherein said conductive pads have a hexagonal, elliptical, or circular shape.

19. A method of labeling an object comprising selectively applying focused energy to a plurality of thermally conductive pads on said object so as to heat selected thermally conductive pads with said focused energy;

wherein said conductive pads are disposed adjacent to a thermochromic layer and heating of said selected thermally conductive pads is sufficient to cause corresponding portions of said thermochromic layer to permanently change optical properties so as to form a visible label in said thermochromic layer on said object.

20. The method of claim 19, wherein said corresponding portions of said thermochromic layer change their optical density in response to said heating so as to form said label.

21. The method of claim 19, wherein said conductive pads are between five and fifty μm across.

22. The method of claim 19, wherein said conductive pads have a hexagonal shape.

23. The method of claim 19, wherein said conductive pads have an elliptical shape.

24. The method of claim 19, wherein said conductive pads have a circular shape.

25. The method of claim 19, wherein selectively applying focused energy comprises applying a laser to selectively heat said thermally conductive pads.

26. The method of claim 25, wherein said object comprises an optical disc and said method further comprises applying said laser with an optical read/write disc drive.

* * * * *

UNITED STATES PATENT AND TRADEMARK OFFICE
CERTIFICATE OF CORRECTION

| | | |
|---|---|---|
| PATENT NO. | : 7,212,223 B2 | Page 1 of 1 |
| APPLICATION NO. | : 10/422002 | |
| DATED | : May 1, 2007 | |
| INVENTOR(S) | : Mitchell A Abrams et al. | |

It is certified that error appears in the above-identified patent and that said Letters Patent is hereby corrected as shown below:

In column 7, line 27, in Claim 1, after "creates" delete "to".

In column 8, line 19, in Claim 15, delete "apposite," and insert -- opposite, --, therefor.

In column 8, line 36, in Claim 19, delete "tbermochromic" and insert -- thermochromic --, therefor.

Signed and Sealed this

Eighteenth Day of August, 2009

David J. Kappos
*Director of the United States Patent and Trademark Office*